United States Patent
Rangachar

(10) Patent No.: US 6,249,519 B1
(45) Date of Patent: Jun. 19, 2001

(54) FLOW BASED CIRCUIT STEERING IN ATM NETWORKS

(75) Inventor: Suresh Rangachar, Gaithersburg, MD (US)

(73) Assignee: Mantra Communications, Germantown, MD (US)

( * ) Notice: Subject to any disclaimer, the term of this patent is extended or adjusted under 35 U.S.C. 154(b) by 0 days.

(21) Appl. No.: 09/061,149

(22) Filed: Apr. 16, 1998

(51) Int. Cl.[7] ......................................... H04J 3/16
(52) U.S. Cl. ..................... 370/356; 370/230; 370/235; 370/395; 370/401; 370/465
(58) Field of Search .................. 370/259, 285, 370/356, 395, 401, 402, 428, 465, 469, 477, 229, 230, 235, 237

(56) References Cited

U.S. PATENT DOCUMENTS

| | | | |
|---|---|---|---|
| 5,506,844 | * 4/1996 | Rao ........................................ | 370/477 |
| 5,761,424 | * 6/1998 | Adams et al. ......................... | 370/428 |
| 5,901,142 | * 5/1999 | Averbuch et al. ..................... | 370/469 |
| 6,023,470 | * 2/2000 | Lee et al. .............................. | 370/401 |

\* cited by examiner

Primary Examiner—Douglas Olms
Assistant Examiner—Shick Hom
(74) Attorney, Agent, or Firm—Lalos & Keegan; Alfred A. Stadnicki

(57) ABSTRACT

An application-based circuit steering apparatus and method for redirecting cells within a cell-based network. The circuit steering apparatus includes a data input port configured to receive a packet including one or more cells containing data for an application to be communicated via the network, a monitor configured to sample one or more initial cells of the packet to determine application information relating to the application, and a redirection unit for diverting cells of the packet from a predetermined path within the network to an alternate path within the network based on the application information.

27 Claims, 5 Drawing Sheets

FLOW BASED CIRCUIT STEERING IN ATM NETWORKS

TECHNICAL FIELD

The present invention relates generally to ATM (Asynchronous Transfer Mode) communication networks, and more specifically, to a monitoring and traffic control apparatus for ATM communication networks.

BACKGROUND ART

ATM (Asynchronous Transfer Mode) high-speed switched networks have been proposed as a technology capable of integrating present digital services with new multimedia services, e.g., video on demand, live television from many sources, CD-quality music, LAN interconnection, and high-speed data transport for science and industry. To implement these different services, ATM networks are designed to handle a variety of traffic characteristics, e.g., constant rate, variable rate, and bursty, required for various real time, such as video conferencing, and non-real time, such as E-mail and web browsing, applications. The basic principles of ATM networks are well known to those skilled in the art and are discussed in numerous published references (see, for example, Andrew S. Tanenbaum, Computer Networks, Prentice Hall, 1996, 3rd ed.).

FIG. 1 illustrates an ATM network 6 with a simple topology and is shown herein for purposes of explanation of the operations of an ATM network relevant to the present invention. User A, User B, and Security Server C denote host computers which are connected at nodes to the network. The host computers generally execute applications for consumers whereas the ATM switches 1–5 of the ATM network 6 are solely concerned with the communication of data among the hosts along paths 31, 34, and 38. A host computer node could be a single host computer or multiple host computers connected via a local area network (LAN) or other type closed network. Each user is connected to the ATM network by a User-Network Interface (UNI), and the ATM switches are connected together by a NetworkNetwork Interface (NNI).

By way of example, in FIG. 1, one possible path of data flow would be from User A across the UNI to switch 1, and from switch 1 to switch 2 to switch 4 across the NNI interfaces and from switch 4 to User B across the UNI interface. In this example, User A would be considered the source user computer and User B the destination user computer. A path between User A and User B in the network is referred to herein alternately as connection or circuit.

This application also refers to the ingress and egress of the network denoting boundary points where data transfers to users. The ingress is where data enters the network from a source user. In FIG. 1, this would be the interface between User A and Switch 1. The egress is where data leaves the network to the destination computer. In FIG. 1, this would be the interface between User B and switch 4.

The ATM switches transfer data using a cell switching technology. All data in an ATM network is transmitted between the switches of the network in small, fixed size 53 byte long ATM cells having 5 bytes for a header and 48 bytes for the data payload. The header of each cell contains a virtual connection identifier used for routing the cells over the network. Each ATM cell contains a two-part connection identifier in the cell header: a Virtual Path Identifier (VPI) and a Virtual Circuit Identifier (VCI). This two-part connection identifier uniquely identifies an ATM virtual connection on a physical interface.

ATM is a connection-oriented technology. That is, a call is required by user A to user B, similar to a telephone call, to set up a connection between the two users. Once the connection path is established, all data cells are transferred over the same connection path. This guarantees that cells will be delivered in order. Although ATM establishes a circuit between hosts, it establishes this circuit internally using cell switching technology. When a virtual circuit is established between hosts, what really happens is that table entries storing routing information are made in each switch along the path between the hosts.

Referring to FIG. 1, the following is an example of what happens when a user A connects to user B. First, user A sends a call request to user B. The call request arrives at switch 1. Call control software located at switch 1 uses NNI signaling procedures combined with NNI routing services to locate user B and establish a virtual connection over which user A and user B exchange data.

Once a connection is established, data can be exchanged between User A and User B. Typically, the flow of data proceeds as follows. User A opens an application on the computer of User A which sends data to User B. Network software at User A's side will receive the data from the application of user A, and arrange the data into packets. Each packet is arranged as a variable length sequence of 53 byte ATM cells carrying the data payload preceded by a packet header cell containing information related to the application. The packets are sent over the ATM network cell by cell from User A to User B. The cells are reassembled into packets by software at User B's end and presented to User B as an application packet.

ATM networks provide several mechanisms for assuring quality of service and regulating traffic flow and congestion. Traffic shaping and traffic congestion control have been proposed for ATM networks. In traffic shaping, a quality of services contract is formed before data transmission between the customer and the network where the required transmission parameters are specified. For example, a customer could specify a requirement that data be transferred with a delay of 10 microseconds. In turn, the customer is required to abide by conditions of the contract, e.g., to transmit below an agreed upon rate. Traffic policing functions, e.g., user parameter control within the ATM network enforce the user's agreement to the terms in the contract. The ATM network also performs traffic congestion control. One proposed technique of traffic control is to control traffic flowing into the network at the ingress points of the network. A simple "open loop" congestion control method would discard cells at the ingress point before entering the network if congestion occurs. A "closed loop" method of flow control would collect status information on the network and throttle back cell delivery if congestion occurs.

The current ATM techniques of policing, and traffic/congestion control are limited in that the techniques do not take into account information on the application type of the ATM data cells. For example, a general cell rate algorithm will check every cell to see if it conforms to a maximum allowable arrival rate. However, the algorithm does not ascertain information on the application to which a cell belongs, because this information is contained in a higher level packet structure created by the application consisting of a header followed by a plurality of ATM cells. Management of the data flow at the application level is still possible, but is not supported by the ATM network and thus must be performed by the user.

A problem arises due to the above limitation in the situation where a source computer wishes to execute several applications during the same session requiring data be exchanged between the source computer and the destination computer. For example, a web browser application may require exchange of HTML data, and this exchange may require the user to open up an additional application requiring exchange of image data or even real time voice data.

In known ATM networks, there are basically two inadequate solutions towards solving this problem. In the first solution, a user sends both applications over the same virtual circuit which was established at the beginning of the session. However, if the circuit was initially established to meet a quality of service for a particular application, the connection established can not be guaranteed for any application of a different type. This may create a bottleneck in the original path since the new data of the new application may require an altogether different level of buffering and other quality of service (QOS) requirements. As a second solution, a user could execute a setup operation for each application and move the data of the applications over the separate paths. However, this would place a significant burden on the user since not only must a new communications path be created for each application, which requires additional setup time, but additionally the opened connections must also be managed.

Another problem is that of security. Many corporations now have a firewall between the company network and any public network so that there is only one path through which data can pass. The packets of data pass through the firewall where they are disassembled, inspected, and a decision made whether they should be passed on to security or permitted through. As an example, a security administrator may want to bar certain applications from using the company's network such as ftp transfer requests directed from the outside to the corporate network. In a typical conventional implementation, the packets will be disassembled at a router which receives packets from the outside network to determine the information of type of application. Software will be installed in the router to perform this function. This presents several disadvantages. First, the firewall router has the burden of monitoring and extracting the application information from the received packet. Additionally, this creates a cost in complexity and time delay because a packet has to be completely disassembled and reassembled at the router.

In order to overcome the above stated problems, it would be desirable for the ATM network itself to be able to direct ATM cells based on application information within packets, in a way that is transparent to the user.

OBJECTIVES OF THE INVENTION

Accordingly, it is a primary object of the present invention to provide a technique for creating multiple virtual circuits between two users in an ATM network for transmitting multiple applications.

It is another object of the present invention to create such multiple virtual circuits within an ATM network in a manner which is transparent to the users.

It is a further object of the present invention to provide application level load balancing and provide quality of service for multiple applications transmitted over an ATM network without coordinating with the user.

It is a still further object of the present invention to provide a technique for controlling flow and congestion of traffic in an ATM network without requiring coordination with any user.

It is yet another object of the present invention to facilitate processing of packets at the application level to detect violations in security.

It is still another object of the present invention to provide application-based policing within an ATM network.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention provides an application-based circuit steering apparatus and method of redirecting cells for a cell-based network. Although, the present invention is envisioned to be used in an ATM network, it could also be used in cell-based networks other than ATM networks, which now exist or may be developed in the future. The circuit steering apparatus and method of redirecting cells could be located on different devices, i.e., a switch, a host computer, a router, a gateway. It is also possible that different steps of the method could be performed on different devices.

According to the method of the present invention, data is received from a source node connected to the cell-based network to be transmitted to a destination node connected to the same cell-based network or architecturally similar cell-based network. The source node may be a host computer running applications for users. The source node may also represent other configurations which present data to the cell-based network from users executing applications, such as, for example, a router connecting a local area network to the cell based network, or a gateway connecting another network to the cell based network. The received data is grouped into packets wherein each packet in broken into one or more cells preceded by a header cell.

In a preferred embodiment, the computer of the source node may be running multiple applications. Each application generates packets of data organized into cells, so that the source user is transmitting onto the network one or more packets of cells from applications.

Next, at least one of the data cells of a received packet are sampled to determine application information related to the application. Typically, the first cell of a packet will be sampled, but the application information could be located in the first few cells. Finally, the data cells of the sampled packet are redirected from a predetermined path to an alternate predetermined path within the network based on the application information.

According to one aspect of this invention, the application information determined for a packet is used to determine a security status for the packet, and all the cells of that packet are redirected to a security server if it is determined a packet of this type violates security, or alternately, the violating cells could be immediately dropped or blocked from passing through network.

In another aspect of this invention, the application information determined for a packet is used for application-based policing of cells entering the network. If cells do not conform to data parameters, they are diverted by redirecting them to another path, including blocking them from the network. The data parameters may be determined from application information. The data parameters could include, along with the application-based parameters, other information, such as parameters which are part of a quality of service contract between the user and the network, and time of day and such other operational parameters.

In still another aspect of this invention, divergence and convergence of multiple virtual circuits for multiple applications is managed. A divergence unit sets up multiple virtual circuits in the network capable of being opened simultaneously between the source node and the destination node. The divergence unit is typically located at the ingress point of the network. There is provided one path for each application type. Each of the paths were previously established by the redirection unit. A convergence unit converges the multiple paths by mapping the headers of each cell as they arrive at the egress point into a uniform header so that the uniform header is presented to the destination computer. The uniform header is the header which would have been presented to the destination computer if only a single path had been opened. The convergence unit is typically located at the network egress point. This could be at the egress switch, but could also be at another location near the egress of the network such as at the destination computer or in a separate unit located near the destination computer.

BEST MODE FOR CARRYING OUT THE INVENTION

Figure 1:
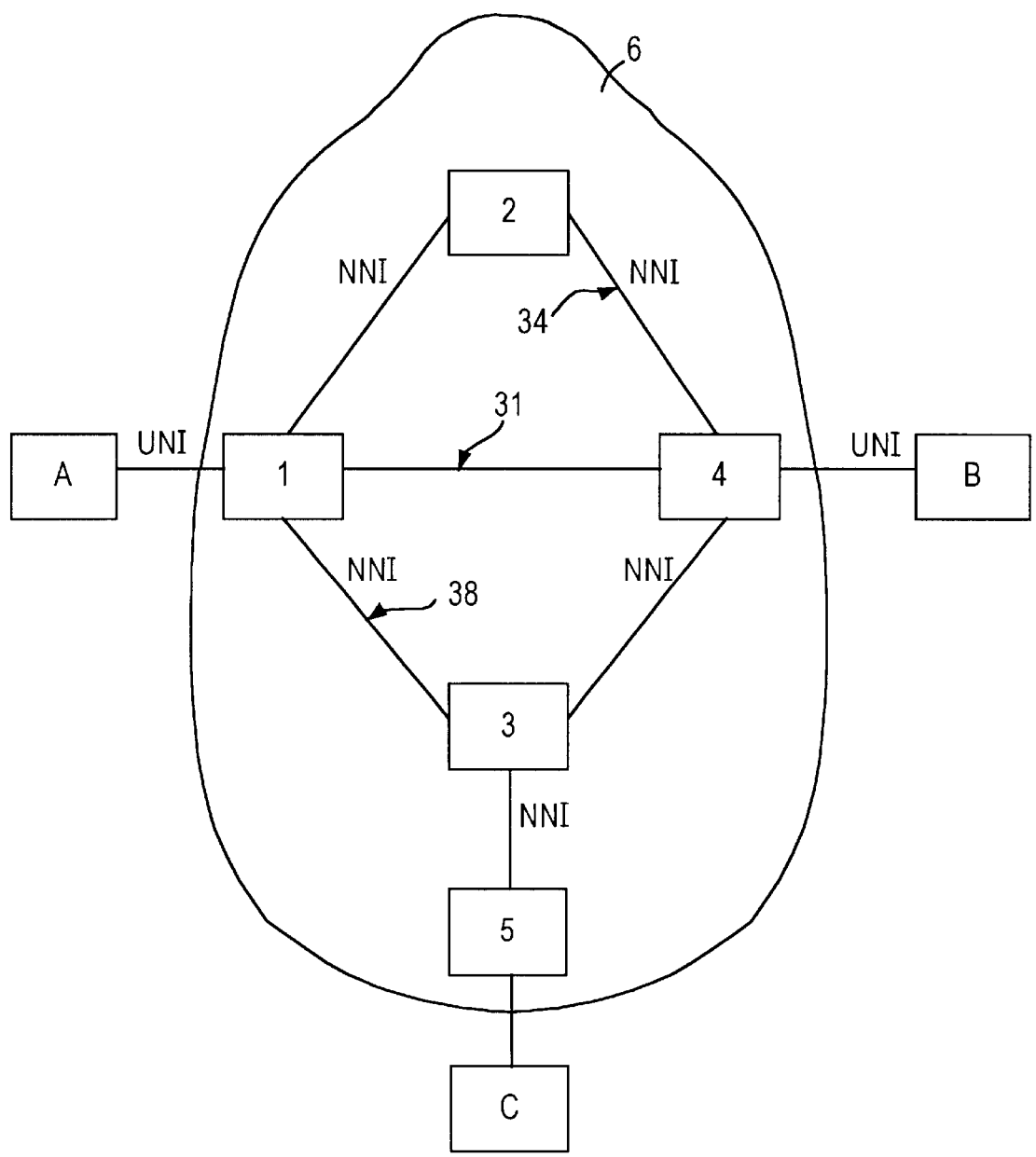
FIG. 1 is a system diagram showing host computers connected to a conventional ATM network.
Figure 2:
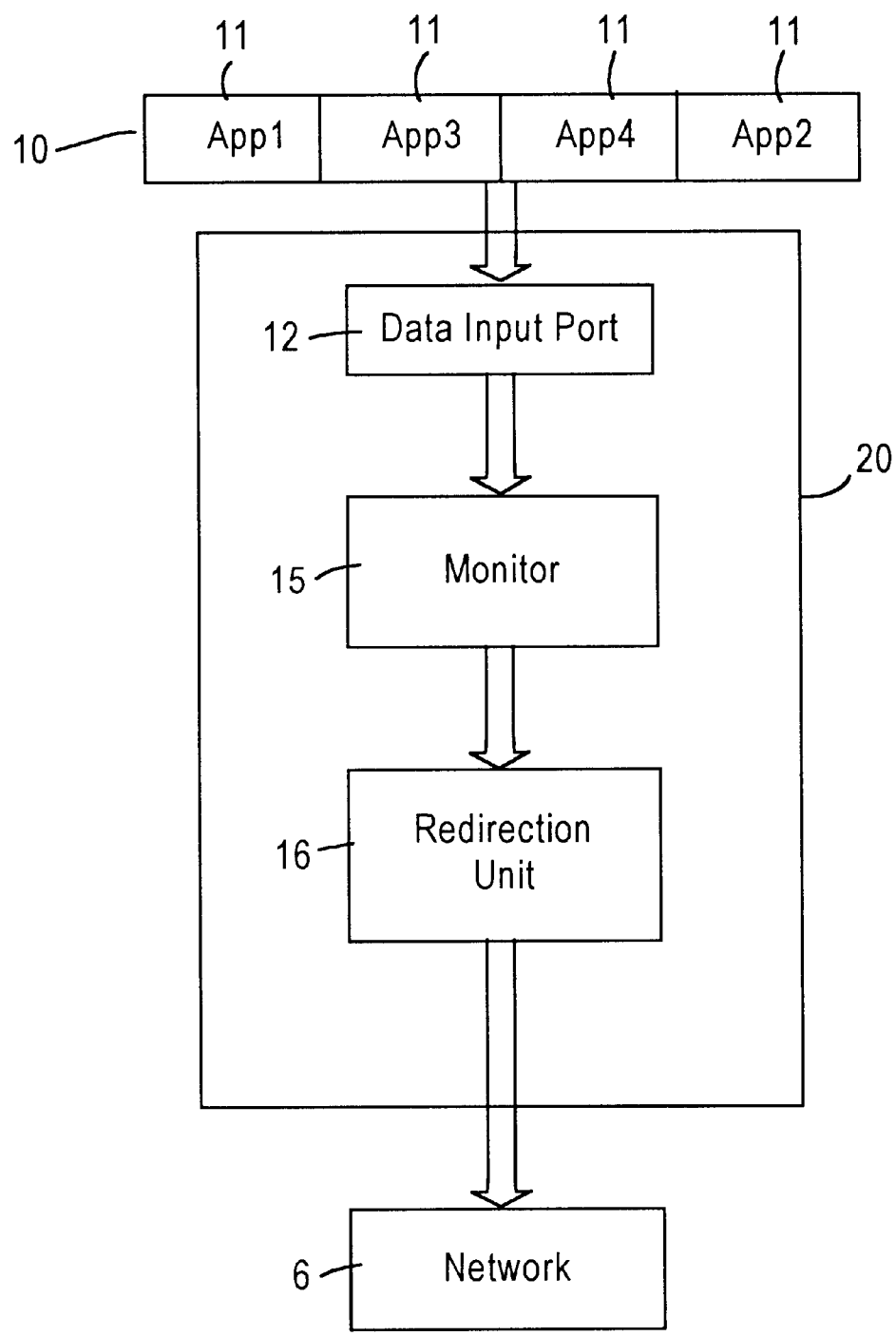
FIG. 2 is a block diagram of an application-based circuit steering device in accordance with the present invention.

FIG. 2 illustrates one preferred embodiment of a circuit steering apparatus according to the present invention. In this embodiment, the circuit steering apparatus 20 is located in the ATM switch 1 of FIG. 1, although this is not mandatory to the implementation. For example, the circuit steering apparatus could also be a separate hardware unit located between the data stream of the host computer A and switch 1 of FIG. 1.

A switch will have a predetermined number of input and output lines for receiving cells from the input lines and switching these stream of cells onto the output lines. The data input port 12 of the circuit steering apparatus 20 has access to the input data stream of cells 10 to switch 1 so as to be able to sample any data cell entering switch 1.

The data stream 10 being monitored by the circuit steering apparatus 20 consists of a stream of data packets 11 from various applications. In FIG. 2, one particular sequence of application packets 11 is shown. For example, the label "App 3" denotes a data packet 11 from application 3. In this example, there are four applications designated App 1, App 3, App 4, and App 2.

Figure 3:
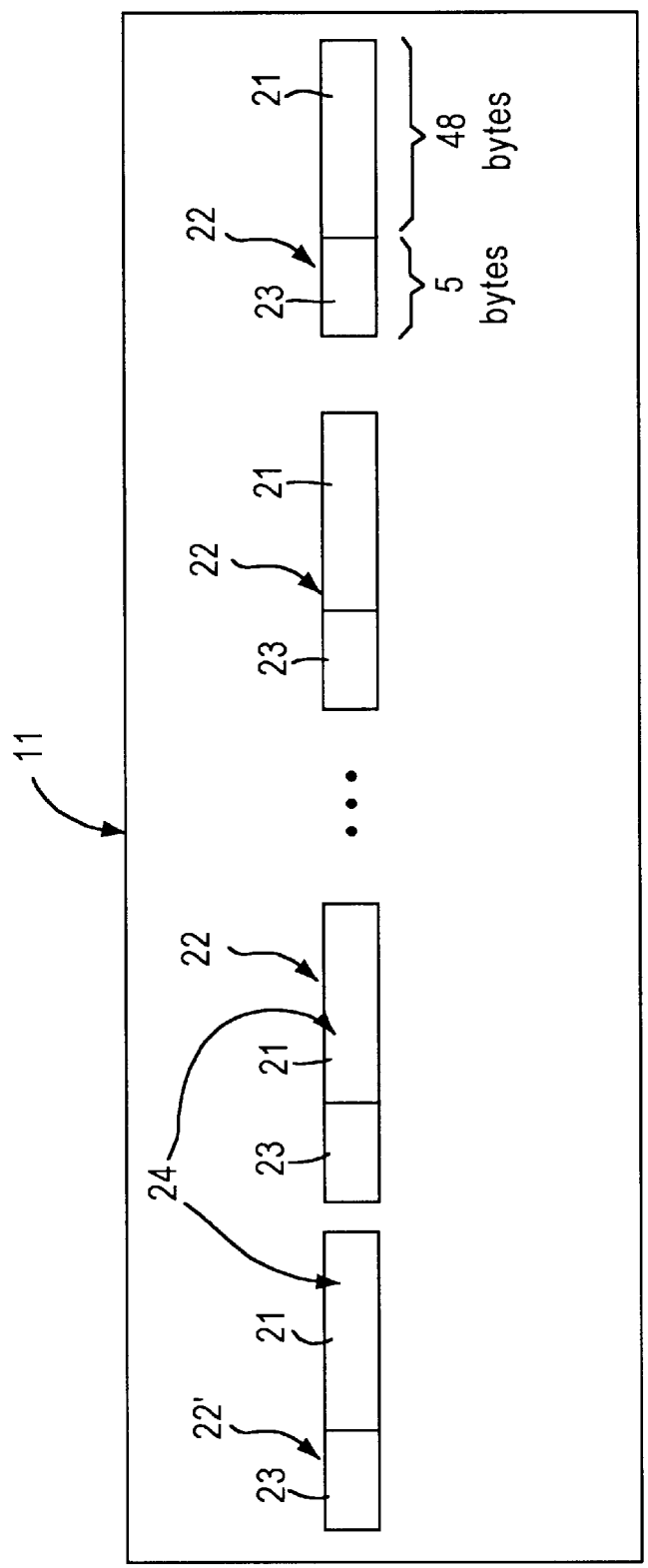
FIG. 3 is a depiction of an application packet structure which can be processed by the device of FIG. 2.

FIG. 3 depicts one possible structure for an application packet 11. The application packet 11 includes a plurality of ATM cells 22 for transporting the data corresponding to an application. In FIG. 3, an ATM cell 22 is 53 byte long having 5 bytes for a cell header 23 and 48 bytes containing the data payload 21 of an application. The header 23 of each cell 22 contains a virtual connection identifier used to route the cell 22 over the network 6 of FIG. 1. The header 23 includes an connection identifier which is split into two parts: a virtual path identifier (VPI) denoting a virtual path through the network 6 and a virtual circuit identifier (VCI) denoting one circuit within the virtual path. This two-part connection identifier uniquely identifies an ATM virtual connection on a physical interface. Every application packet 11 includes a packet header 24 containing information relating to the application. For example, packet header 24 may indicate whether an application is an IP based message, a Telnet command, FTP data, HTML message, and so forth. The packet stream 10 entering data input port 12 is composed uniformly of ATM cells. Thus, the packet header 24 is contained in an ATM cell 22' which unlike the other ATM cells 22, contains information on the application rather than the data making up the application. Typically, all the information of the packet header 24 is contained in the payload 21 of the first cell 22' of packet 11. However, it is possible that for a particularly long header 24, the information of the packet 24 may be spread through the initial few cells 22 of the packet 11.

Referring to FIG. 2, monitor 15 receives ATM cells 22 making up a application packet 11 from data input port 12. Monitor 15 has circuitry, which could be software, to detect the packet header 24 contained in initial cells 22 of the packet 11 of the data stream 10. Typically, all the information of packet 24 will be contained in the payload 21 of the first cell 22'. The monitor 15 can also detect the beginning and ending points of a data packets 11.

The main function of monitor 15 is to extract information related to the application from the header cell 22' or following cells 22 (which may contain spill over header information in their payloads) of the application packet 11 of FIG. 3.

The information related to the application and the boundary information for the application packet 11 are passed on to redirection unit 16. The redirection unit 16 routes the cells 22 of the application packet 11 based on the application-related information as well as other information related to the network 6. For example, the redirection unit may use the application-related information combined with congestion information relating to the network 6 to route the packet along a less congested path within the network 5, e.g., a path with a loading which does not exceed a certain level. The redirection unit may decide whether a packet 11 violates security parameters and whether to direct the packets to a security server C of FIG. 1.

The circuit steering apparatus 20 can also be used to perform application-based policing (ABP). Application-based policing could be an enhancement to a usage parameter control (UPC) device used to enforce a quality of control contract with a user by checking characteristics of the user's data stream 10 such as the traffic burst size and rate. The application-based policing by the circuit steering apparatus 20 would add functionality, in addition to that available at a UPC device at the cell level. Thus, cells can be policed by application basis, and certain applications prohibited and therefore either discarded or redirected by the redirection unit 16. Alternatively, the UPC can be completely replaced with ABP provided by the circuit steering apparatus 20, for example, by putting the ABP before the UPC. If desired, only certain applications would be allowed to be inspected by the UPC. By putting the ABP after the UPC only applications which fall within the requirements set by the UPC will be monitored by the circuit steering apparatus 20.

Referring again to FIGS. 1 and 2, a path for data and control information is shown from the redirection unit 16 to the network 6. If the redirection unit 16 creates a new path in the network, this will require the redirection unit 16 to setup a call in the network 6 to update the necessary switches 1–5. In this embodiment the circuit steering device 20 located in switch 1 could employ pre-existing NNI signaling and NNI routing services which are also located in switch 1 to create a new path. The flow of data cells 22 through the network 6 can then be diverted to the new path by changing the virtual connection identifier within each cell's header 23.

Figure 2A:
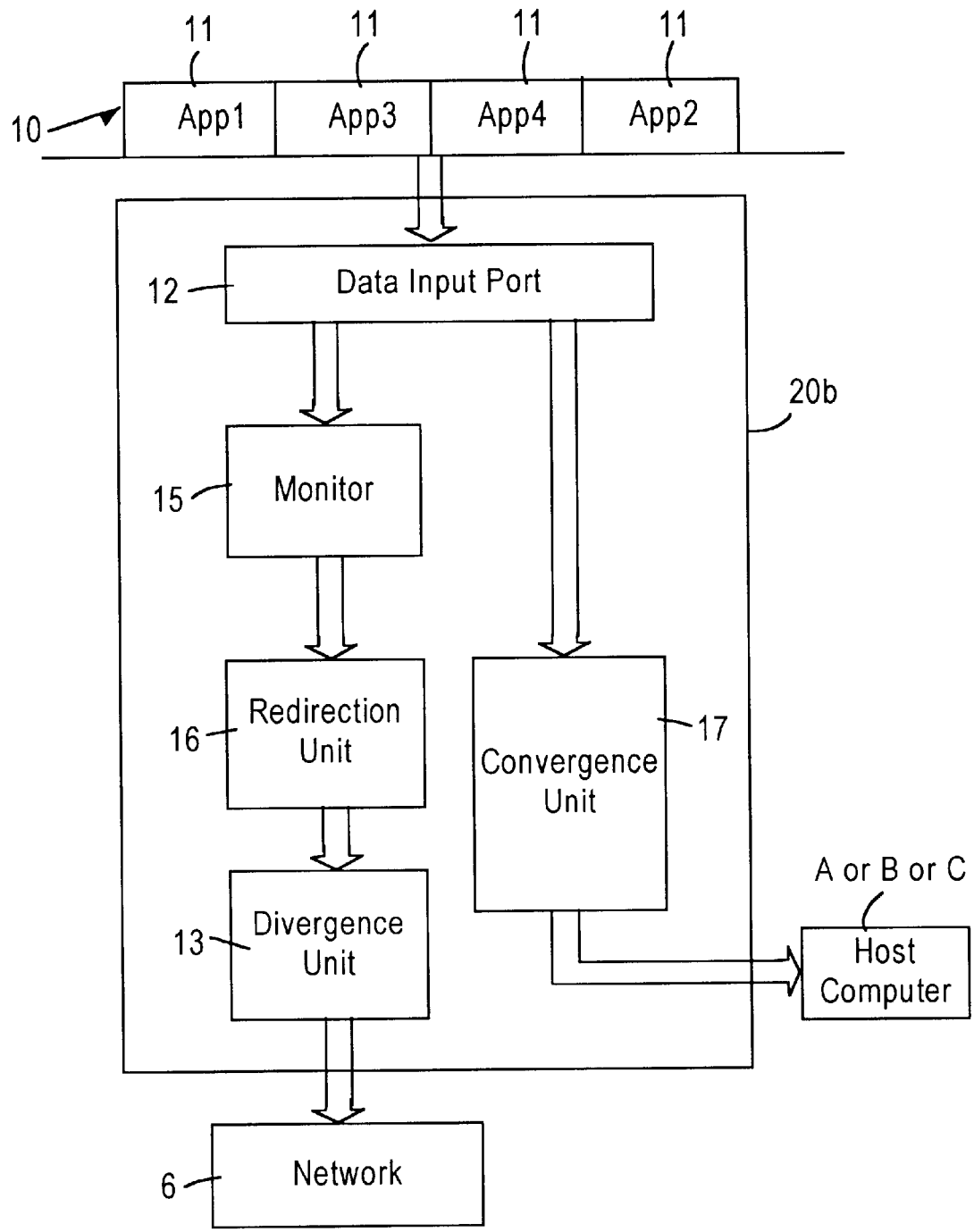
FIG. 2a is a block diagram of an embodiment of the circuit steering apparatus which performs convergence and divergence.

FIG. 2a an embodiment of the circuit steering apparatus 20b modified to perform this divergence/convergence process. The divergence unit 13 manages the divergence of packages at the ingress point of the network 6. Initially, before performing divergence, the divergence unit 13 first receives information on the established connection from the redirection unit 16. The divergence unit 13 then manages the sending of packets over the existing connection of the network 6. The convergence unit 17 collects cells at the egress point of network 6, modifies each cell header to that of a uniform header, and sends the cells to the destination computer. In FIG. 2a, the redirection unit 16, the divergence unit 13, and the convergence unit 17 belong to the same unit 20b. All switches of the network will need to have one of these units, since a switch may function as an egress or ingress switch depending on whether it is routing packets into the network from a host computer or out of the network to a host computer. Within an ingress switch, the divergence unit 13 of the circuit steering apparatus 20b will divert packages to the network. Within an egress switch, the convergence unit 17 will converge packages received from the network and send them to the host computer.

The divergence unit 13 and convergence unit 17 according to the present invention is further configurable to setup a separate circuit for each application. This process is transparent to the computer user. A computer user can have several applications opened simultaneously, with the data of each application traveling over a different circuit optimized for that application.

Figure 4A:
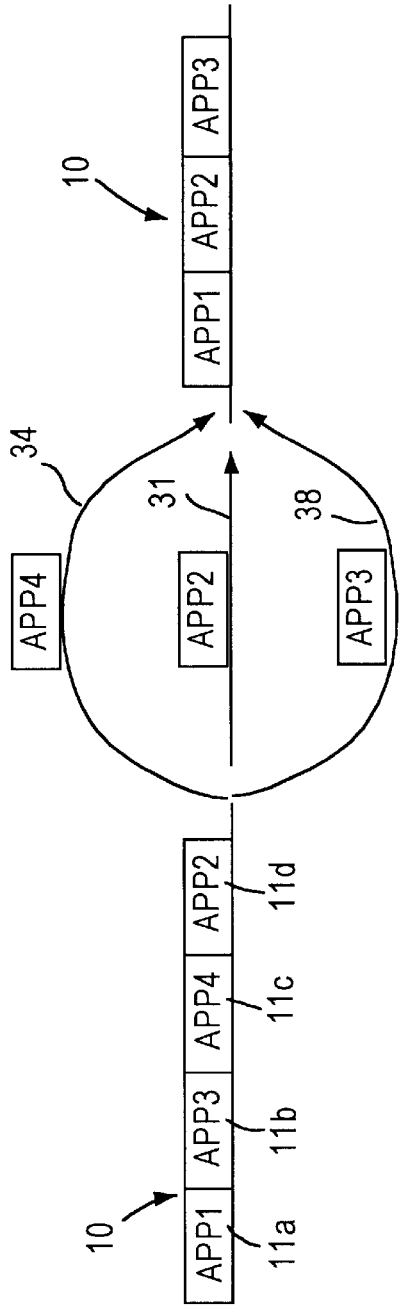
FIG. 4a is a diagram illustrating divergence and convergence of packets traveling over multiple connections of an ATM network in accordance with the present invention.
Figure 4B:
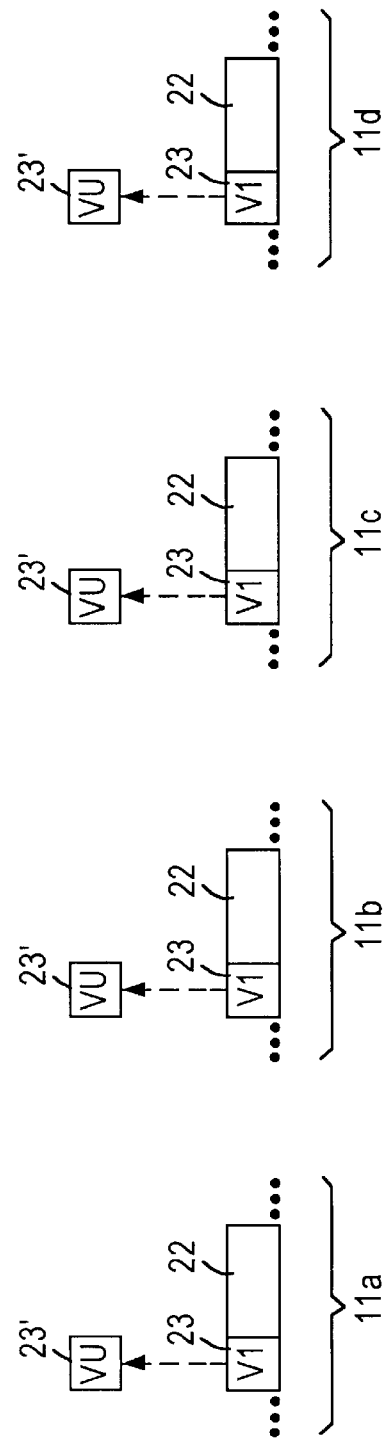
FIG. 4b depicts the modification of packets according to the present invention.

FIGS. 4a–4b illustrate management of the separate paths through the network for multiple applications by the circuit steering apparatus 20b of FIG. 2a. FIG. 4a illustrates the situation where, as part of the divergence process, User A sends data from more than one application, as shown APP 1–APP 4, over different paths of the network 6. The source computer generates data sequence 10, in this case consisting of packets from opened applications APP1–APP4, which flows through the network 6, so that the destination computer receives data sequence 10. For example, as shown in FIG. 3 and referring back to FIG. 1, path 34 may be route A-1-2-4-B, path 31 may be route A-1-4-B, path 38 may be route A-1-3-4-B. In this example, the applications APP 2, APP 4, and APP 3 are of different types and thus the packets 11 of stream 10 coming from User A follow separate paths through the network 6 with packets 11 of application APP 4 following path 34, packets 11 of application APP 2 following path 31, and packets 11 of application APP 3 following path 38.

The application load balancing performed by the circuit steering apparatus 20 is transparent to the users A and B. Thus, the users B will receive the data over the network 6 by a transmission over a path meeting quality of service requirements, but to the user B the data is received as if it had gone over a single path. To achieve this transparency, the cells at the egress switch 4 of the network 6 are converged by the circuit steering apparatus located at switch 4. At the egress switch 4, the convergence unit 17 of the circuit steering apparatus 20 converges the applications received over the multiple paths by mapping headers 23 of each cell 22 as they arrive into a uniform header 23'.

An example of the modification of a packet 11 as it travels through the network, as depicted in FIG. 4a, is shown in FIG. 4b. In FIG. 4b, a typical cell is shown representative of the plurality of cells for each application packet 11a–11d. As shown in FIG. 4b, the cells in each application packet 11a–11b has a different header v1–v4 containing information relating to the particular path that the cells of that particular application travel in the network. As an example, consider where the cells 22 for a packet of application 11 has cell headers 23 with value "v1". The convergence unit 17 modifies the cell header 23 of packet 11a from "v1" to the value "vu" denoted as cell header 23'. In general, every packet 11 would be modified at the egress point, e.g., switch 4 of the network 6 after being sent over the network 6 to the egress point, e.g., switch 4. At the egress point, the convergence unit 17 changes each cell header 23 of packet 11 to a uniform header "vu". Every packet from every application APP 1–APP 4 is modified as this point to have the same uniform header 23' with value "vu". Thus, user B is presented with packets having a single header "vu" and does not know that three paths have been taken by the data.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. an ATM network, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A circuit steering apparatus for a cell-based network, comprising:

a data input port configured to receive a packet including a plurality of cells containing data for an application to be communicated via the network;

a monitor configured to sample one or more initial cells of the packet to determine application information relating to the application; and a redirection unit configured to divert cells of the packet from a predetermined path within the network to an alternate path within the network based on the application information.

2. The apparatus of claim 1, wherein the network is an ATM network.

3. The apparatus of claim 1, wherein the one or more initial cells is a first cell of the packet.

4. A circuit steering apparatus for a cell-based network, comprising:

a data input port configured to receive a packet including a plurality of cells containing data for an application to be communicated via the network;

a monitor configured to sample one or more initial cells of the packet to determine application information relating to the application; and a redirection unit configured to divert cells of the packet from a predetermined path within the network to an alternate path within said network based on the application information;

wherein the application information includes security information relating to the application and the redirection unit is configured to divert the cells to an alternate path leading to a security device based upon the application information.

5. A circuit steering apparatus for a cell-based network, comprising:

a data input port configured to receive a packet including a plurality of cells containing data for an application to be communicated via the network;

a monitor configured to sample one or more initial cells of the packet to determine application information relating to the application; and a redirection unit configured to divert cells of the packet from a predetermined path within the network to an alternate path within said network based on the application information;

wherein the application information is security information relating to the application and the redirection unit is further configured to block the cells from entering the network based upon said security information.

6. The apparatus of claim 1, wherein:

the application information represents an application type of the packet; and the redirection unit is further configured to divert the cells of the packet to the alternate path based on the application type.

7. A circuit steering apparatus for a cell-based network, comprising:

a data input port configured to receive a packet including a plurality of cells containing data for an application to be communicated via the network;

a monitor configured to sample one or more initial cells of the packet to determine application information relating to the application; and a redirection unit configured to determine if the cells are nonconforming to particular data parameters based on the application information and to block the cells from entering the network if the cells are determined to be nonconforming.

8. The apparatus of claim 1, wherein the network is an ATM network and the alternate path is one of multiple virtual circuits in the ATM network.

9. The apparatus of claim 1, wherein:

the network includes a plurality of switches; and further comprising:

a divergence unit configured to divert the cells to the alternate path by modifying the header of each cell to designate the alternate path.

10. The apparatus of claim 1, wherein the application information represents an application type, the packet is one of multiple packets each including a different plurality of cells containing data for a different application type to be communicated via the network, the data input port is further configured to receive the multiple packets from a source computer, the source computer having initially established the predetermined path in the network to a destination computer, and further comprising:

a divergence unit configured to communicate each of the multiple packets over the predetermined path or the alternate path from the source computer to the destination computer based on an application type.

11. A method for communicating cells of data over a cell-based network having switches and communication links connecting a source computer to a destination computer, comprising the steps of:

receiving cells from the source computer to be communicated over the network to the destination computer, the cells grouped into packets each of the packets containing cells for an application;

sampling one or more cells of each of the packets to determine application information for each of the packets relating to the application; and communicating from the source computer to the destination computer, the cells of each of the packets over one of a predetermined path within the network and one or more alternate paths within the network based on the application information.

12. The method of claim 11, wherein the cell-based network is an ATM network.

13. The method of claim 11, wherein the one or more sampled cells are initial cells of each of the packets; and the sampling determines the type of application of all the cells of each of the packets.

14. The method of claim 11 wherein the one or more sampled cells are a first cell of each of the packets.

15. A method for communicating cells of data over a cell-based network having switches and communication links connecting a source computer to a destination computer, comprising the steps of:

receiving cells from the source computer to be communicated over the network to the destination computer, the cells grouped into packets each of the packets containing cells for an application;

sampling one or more cells of each of the packets to determine application information for each of the packets relating to the application; and communicating from the source computer to the destination computer, the cells of each of the packets over one of a predetermined path within the network and one or more alternate paths within the network based on the application information;

wherein the sampling includes sampling the one or more cells of each of the packets to determine a security status of each of the packets, and the communicating further includes communicating the cells of each of the packets based also on the security status.

16. The method of claim 11, wherein the step of communicating further includes communicating the cells of each of the packets based on a measure of congestion of the network.

17. A method for communicating cells of data over a cell-based network having switches and communication links connecting a source computer to a destination computer, comprising the steps of:

receiving cells from the source computer to be communicated over the network to the destination computer, the cells grouped into packets each of the packets containing cells for an application;

sampling one or more cells of each of the packets to determine application information for each of the packets relating to the application; and blocking the cells from entering the network if the cells are determined to be nonconforming to data parameters based on said application information.

18. The method of claim 11, further comprising the step of:

transmitting the cells from the source computer, the source computer running multiple different applications; and wherein the packets are associated with the different applications.

19. The method of claim 18, wherein:

the cells are received in a stream of the packets; and the communicating includes:

diverging the packets associated with the different applications so as to be communicated over different paths in the network capable of communicating the packets between the source computer and the destination computer, one path for each of the different applications; and converging the diverged packets at an egress point connected to the destination computer.

20. The method of claim 19, wherein the converging step converges the diverged packets at the egress point by mapping a header of each cell as they arrive at the egress point into a uniform header so that the uniform header is presented to the destination computer, the uniform header being the header which would have been presented to the destination computer if only a single path had been opened.

21. A packet-switched communications system, comprising:

a plurality of user computers, one of the user computers being designated a source computer, another one of the user computers being designated a destination computer;

a plurality of cell-based switches interconnected together via communications links to form a computer network, one of the cell-based switches designated an ingress switch, and another of the cell-based switches designated an egress switch, the ingress switch connecting the source computer to the computer network and the egress switch connecting the destination computer to the computer network to provide a path where data can flow between the source computer and the destination computer via the computer network, the data being arranged into packets, each of the packets having a plurality of cells containing data for a single application; and an application-based steering unit disposed between the source computer and the ingress switch, including:

a monitor for sampling initial cells of the packets to determine application type information; and a redirection unit for diverting one or more of the packets from a predetermined path between the ingress switch and the egress switch to one or more alternate paths between the ingress switch and the egress switch based on the determined application type information.

22. The system of claim 21, wherein:

the source computer includes a computer executing multiple applications generating a stream of packets of multiple application types, the source computer initially establishing the predetermined path;

the redirection unit establishes the alternative paths, based on the application type information and/or a measure of network congestion.

23. The system of claim 21, wherein:

the cell-based switches are ATM switches.

24. The system of claim 21, wherein:

only a portion of the cell-based switches are ATM switches.

25. The system of claim 21, wherein the computer network is an ATM network, the cell-based switches are ATM switches, and the one or more alternative paths are virtual circuits within the ATM network.

26. The system of claim 21, wherein the packets are received by the steering unit in a stream of packets and the steering unit includes a divergence unit configured to diverge packets from the stream of packets to communicate the packets between the source computer and the destination computer over the predetermined and the alternate paths, and further comprising:

a convergence unit for converging the diverged packets.

27. The system of claim 26, wherein the convergence unit converges the diverged packets by mapping a header of each cell at an egress point into a uniform header so that the uniform header is presented to the destination computer, the uniform header being the header which would have been presented to the destination computer if the packets had been communicated over only the predetermined path.

* * * * *